(12) United States Patent
Krause

(10) Patent No.: US 7,478,863 B2
(45) Date of Patent: Jan. 20, 2009

(54) SEALING PROFILE COMPRISING A TRIM STRIP

(75) Inventor: Fritz Krause, Wangen (DE)

(73) Assignee: Metzeler Automotive Profile Systems GmbH (DE)

( * ) Notice: Subject to any disclaimer, the term of this patent is extended or adjusted under 35 U.S.C. 154(b) by 572 days.

(21) Appl. No.: 10/530,735

(22) PCT Filed: Oct. 9, 2003

(86) PCT No.: PCT/EP03/11208

§ 371 (c)(1),
(2), (4) Date: Apr. 8, 2005

(87) PCT Pub. No.: WO2004/037576

PCT Pub. Date: May 6, 2004

(65) Prior Publication Data

US 2008/0030046 A1 Feb. 7, 2008

(51) Int. Cl.
*B60J 1/08* (2006.01)
(52) U.S. Cl. ............... 296/146.2; 296/146.9; 296/1.08; 49/490.1
(58) Field of Classification Search ........... 296/146.1, 296/146.2, 146.3, 146.9, 1.08; 49/490.1, 49/495.1, 502
See application file for complete search history.

(56) References Cited

U.S. PATENT DOCUMENTS 4,656,784 A * 4/1987 Brachmann ............... 49/490.1
5,168,668 A * 12/1992 Mishima et al. ........... 49/440
5,618,608 A * 4/1997 Teishi ....................... 428/122
5,743,047 A * 4/1998 Bonne et al. ............... 49/490.1

(Continued)

FOREIGN PATENT DOCUMENTS

DE 197 36 899 C2 3/1999

(Continued)

*Primary Examiner*—Jason S Morrow
(74) *Attorney, Agent, or Firm*—Stephen B. Salai, Esq.; Michael J. Didas, Esq.; Harter Secrest & Emery LLP

(57) ABSTRACT

A sealing profile (10a, 10b) for sealing a powered window pane (11a, 11b) in a door (12a, 12b) of a motor vehicle. The sealing profile (10a, 10b) includes a base body (18) made of an elastomeric material on which at least one sealing portion (19a, 19b) and at least one fastening portion (20) for attaching the sealing profile (10a, 10b) to a door flange (21) are provided. The sealing profile (10a, 10b) also includes at least one trim strip (22) that has a finishing portion (23) and a fastener (24), which protrudes therefrom and which can be fixed to the base body (18) in a positive manner. The trim strip (22) is curved in the longitudinal direction thereof. The fastener (24) is provided in the form of an elongated insertion limb, which is oriented essentially perpendicular to the finishing portion (23). The fastener (24) is additionally provided with at least one appendage (25a, 25b). The base body (18) comprises a flexible reinforcing element (27) that reinforces the finishing portion (23) in the area of the door flange (21). The base body (18) also includes a slot-shaped retainer channel (28), which extends along the limb of the reinforcing element (27), said limb running essentially parallel to the door flange (21), and which is provided with at least one recess (31a, 31b). The fastener (24) is placed inside the retainer channel (28), and the appendage (25a, 25b) of the fastener (24) engages in a positive manner inside the associated recess (31a, 31b) of the retainer channel (28).

19 Claims, 3 Drawing Sheets

U.S. PATENT DOCUMENTS

| | | | |
|---|---|---|---|
| 6,370,824 B1 * | 4/2002 | Keeney et al. | 49/441 |
| 6,652,952 B2 * | 11/2003 | Drozd et al. | 428/122 |
| 6,679,003 B2 * | 1/2004 | Nozaki et al. | 49/441 |
| 2007/0101656 A1 * | 5/2007 | Stipp | 49/490.1 |
| 2007/0262608 A1 * | 11/2007 | Saito | 296/146.7 |

FOREIGN PATENT DOCUMENTS

| | | |
|---|---|---|
| DE | 199 22 749 A1 | 11/2000 |
| JP | 04110228 A * | 4/1992 |
| WO | WO-01/34933 A1 * | 5/2001 |

* cited by examiner

SEALING PROFILE COMPRISING A TRIM STRIP

FIELD OF THE INVENTION

The present invention relates to a sealing profile or weatherstrip for sealing a powered window pane in a motor vehicle door, comprising a base body made of an elastomeric material, in which at least one sealing portion and at least one fastening portion for defining the sealing profile at a door flange is provided, and including at least one trim strip comprising a finishing portion and a fastener protruding therefrom for positive definition on the base body.

BACKGROUND ART

A sealing profile is known from DE 197 36 899 C2. This sealing profile serves to weatherseal a window cavity in a motor vehicle door. The trim comprises a fastener protruding from the finishing portion, which is positively clasped by a pivoting retaining portion when fitting the sealing profile to the vehicle.

Known from DE 199 22 749 A1 is another sealing profile configured, on the one hand, to weatherseal a powered window pane and, on the other hand, to weatherseal the door gap. A trim strip mounted on the outside is defined by means of U-shaped holding clips on the base body of the sealing profile.

BRIEF DESCRIPTION OF THE INVENTION

The invention is based on the object of providing a sealing profile on which the trim strip can now be defined by simple and reliable means.

To achieve this objective with a sealing profile of the aforementioned kind it is proposed that the trim strip is curved lengthwise, that the fastener is configured as an elongated insertion limb oriented substantially perpendicular to the finishing portion and that at least one appendage is provided at the fastener for positively engaging in a corresponding recess on the base body.

The fastener configured as an insertion limb serves as a support for the bending action of the trim strip. Furthermore, the fastener oriented substantially perpendicular to the finishing portion prevents the finishing portion from tilting out of place. In addition, any twisted location is excluded by the fastening as provided for the trim strip. In conclusion, fabrication and fitting are greatly simplified since no additional parts, for example clips, are needed to define the trim strip.

Preferably the trim strip is configured as an extruded aluminum part.

In a first advantageous aspect the fastener protrudes from an upper end portion of the finishing portion, so that in the fitted condition of the trim strip the fastener is located above the door flange.

In another advantageous aspect the fastener protrudes from a middle portion of the finishing portion so that in the fitted condition of the trim strip the fastener is located below the door flange.

Advantageously, appendages are configured at the finishing portion, which engage in corresponding recesses on the base body, resulting in a positive fixation of the finishing portion to the base body.

Advantageously, a slotted retainer channel for receiving the fastener is incorporated in the base body. When fitting the trim strip to the base body the fastener is inserted in the slotted retainer channel to be thereby positively defined.

In another advantageous aspect the fastening portion comprises a reinforcing element configured flexible.

In yet another advantageous aspect the base body comprises a first sealing portion for weathersealing the powered window pane and a second sealing portion for weathersealing the door gap.

Advantageously, the first sealing portion comprises sealing lips, which protrude from the base body and contact the powered window pane.

For weathersealing the door gap the second sealing portion may advantageously comprise sealing lips, which protrude from the base body and come into contact with the vehicle body.

Preferably, the sealing lips are flock coated on the outside.

BRIEF DESCRIPTION OF THE DRAWINGS

The invention will now be described in detail by way of example embodiments as shown diagrammatically in the drawings in which.

DETAILED DESCRIPTION OF THE INVENTION

Figure 1:
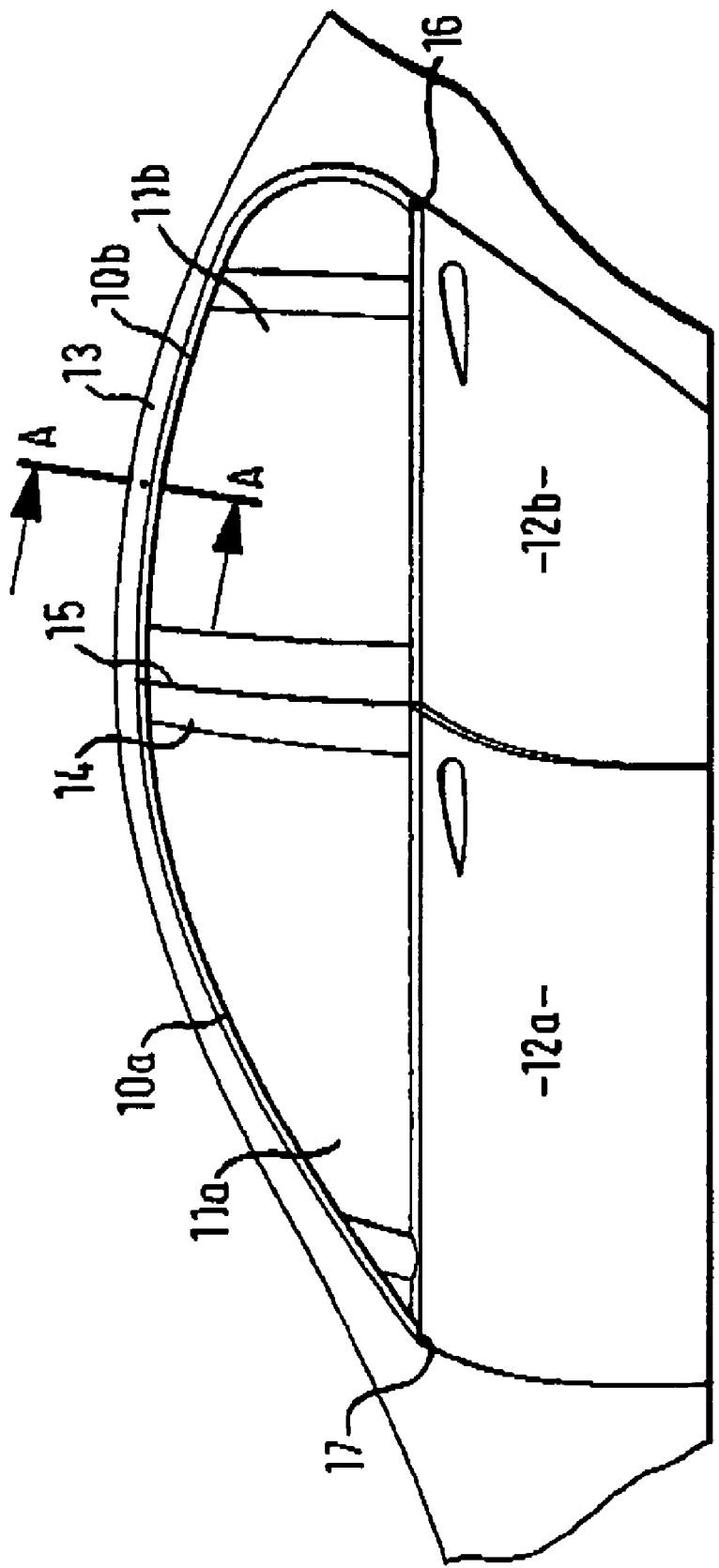
FIG. 1 is a diagrammatic side view of a vehicle including a sealing profile in accordance with the invention.

Referring now to FIG. 1 there is illustrated a side view of a motor vehicle comprising a front door 12a and a rear door 12b in each of which a powered window pane 11a, 11b is arranged for retraction in the door cavity of each door 12a, 12b. To weatherseal the window pane 11a, 11b as well as the vehicle door 12a, 12b relative to the body 13 a sealing profile 10a, 10b is provided. The sealing profile 10a of the front door 12a extends from a leading edge 17 of the front door 12a to the B pillar 14 of the vehicle. The sealing profile 10b of the rear door 12b extends from the B pillar 14 to a trailing edge 16 of the rear door 12b. In the region of the B pillar 14 the sealing profiles 10a, 10b are separated since it is here that the gap 15 parting the doors 12a, 12b is located.

Figure 2:
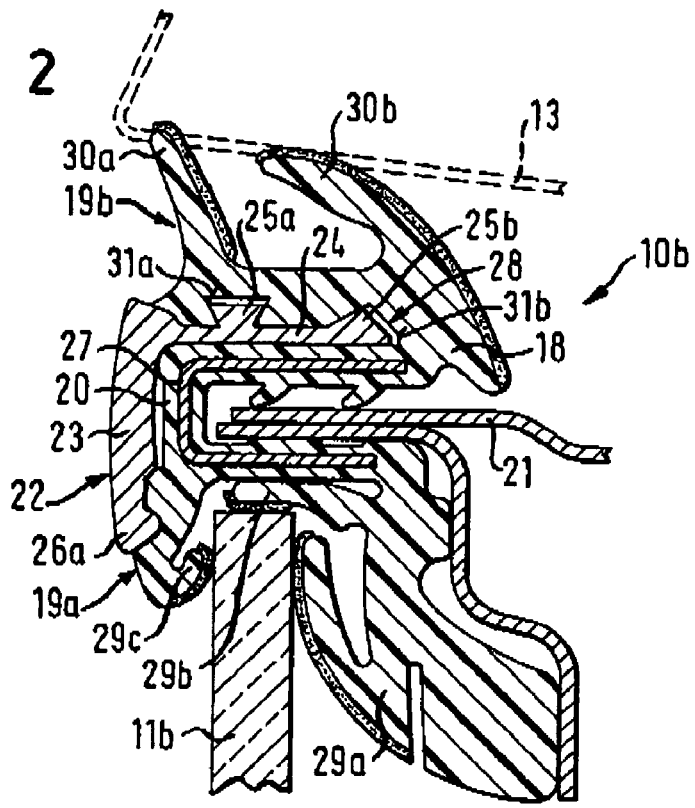
FIG. 2 is a section taken along the line A-A in FIG. 1 in a first embodiment in accordance with the invention.

Referring now to FIG. 2 there is illustrated a section along the line A-A as shown in FIG. 1. The sealing profile 10b comprises a one-part base body 18 extruded of an elastomeric material, for example EPDM. Configured at the base body 18 is a fastening portion 20 in which a flexible reinforcing element 27 is inserted. The fastening portion 20 serves to define the sealing profile 10b at a door flange 21.

The sealing profile 10b comprises a first sealing portion 19a serving to weatherseal the powered window pane 11b. Provided at the first sealing portion 19a are sealing lips 29a, 29b, 29c contacting the outer surface of the window pane 11b. Each of the sealing lips 29a, 29b, 29c is provided with a flock coating. Provided furthermore at the base body 18 is a second sealing portion 19b serving to weatherseal the vehicle door 12b relative to the body 13. The second sealing portion 19b comprises sealing lips 30a, 30b each of which is provided with a flock coating on the outside.

Defined on the base body 18 is a trim strip 22 configured as an extruded strip of aluminum. As evident from FIG. 1, the trim strip 22 is curved to conform with the streamline of the vehicle. The trim strip 22 comprises a finishing portion 23 exposed to view from outside and from which a fastener 24 protrudes substantially vertically. The fastener 24 is configured as an elongated insertion limb. Protruding from the fastener are peg-shaped appendages 25a, 25b. For positively receiving the fastener 24 the base body 18 comprises a retainer channel 28 in which recesses 31a, 31b are molded to receive the appendages 25a, 25b. The retainer channel 28 is arranged above the door flange 21, so that also the fastener 24 is positioned above the door flange 21 in the fitted condition of the trim strip.

The fastener 24 protruding down from an upper region of the trim strip 22 serves as a support for the bending action when bending the trim strip 22 to conform with the streamline of the vehicle. In addition, by configuring the fastener 24 as an elongated insertion limb a reliable definition is achieved in preventing the finishing portion 23 of the trim strip 22 from tilting and twisting out of place.

Provided at the finishing portion 23 endwise is an appendage 26a positively defined at a corresponding receiving location of the base body 18.

To fit the sealing profile 10b first the fastening portion 20 of the base body 18 is mounted on the door flange 21. Then, the trim strip 22 with the fastener 24 is inserted into the retainer channel 28, after which the sealing portion 19b is defined at the fastener 24.

In the final position as shown satisfactory fixation of the trim strip 22 on the base body 18 is achieved.

Figure 3:
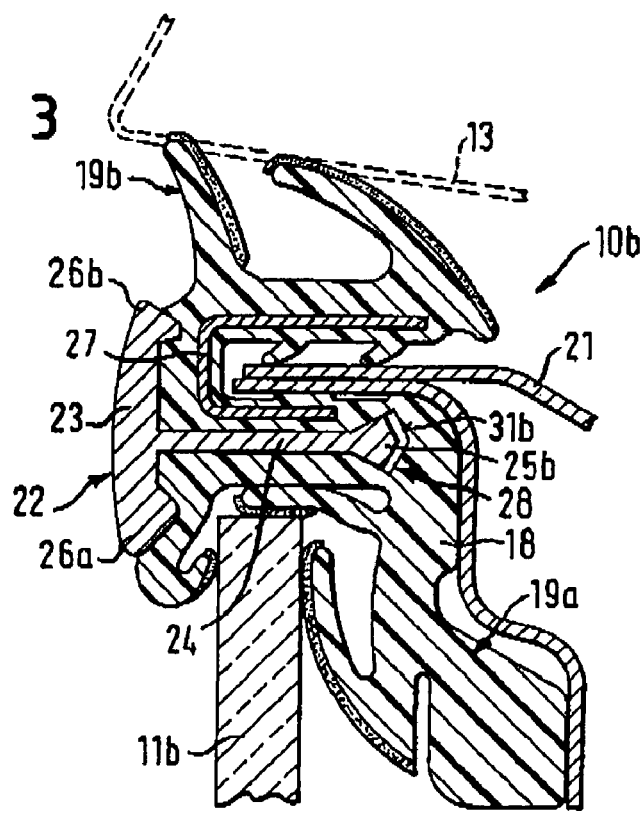
FIG. 3 is a section taken along the line A-A in FIG. 1 in a second embodiment in accordance with the invention and FIG. 4 is a partial section through the sealing profile as shown in FIG. 2 including a peel cord closing off a retainer channel at the end thereof.

Referring now to FIG. 3 there is illustrated a further embodiment in the description of which the reference numerals as already used apply to the same parts or at least parts having the same function. The sealing profile 10b as shown in FIG. 3 differs merely in the deviation from the design of the trim strip 22. In this arrangement the fastener 24 protrudes from a middle portion of the finishing portion 23 of the trim strip 22. The fastener 24 is configured as an elongated insertion limb comprising a peg-like appendage 25b at the end thereof. The fastener 24 is received in a retainer channel 28 of the base body 18. It is this arrangement of the fastener 24 and retainer channel 28 that results in the fastener 24 being positioned below the door flange 21 in the fitted condition of the trim strip 22.

The end portions of the finishing portion 23 are provided with appendages 26a, 26b which are positively received in recesses of the base body 18.

In this embodiment too, configuring the fastener 24 as an elongated insertion limb permits its use as a support for the bending action of the trim strip 22. In addition, the fastener 24 extending depthwise into the base body 18 prevents the finishing portion 23 of the trim strip 22 from tilting out of place.

In principally the same way as for the embodiment as shown in FIG. 2, the embodiment as evident from FIG. 3 first requires fitting of the base body 18 to the door flange 21. Then the trim strip 22 with the fastener 24 protruding substantially vertically is inserted into the retainer channel 28 of the base body 18, resulting in the base body 18 being positively defined.

Figure 4:
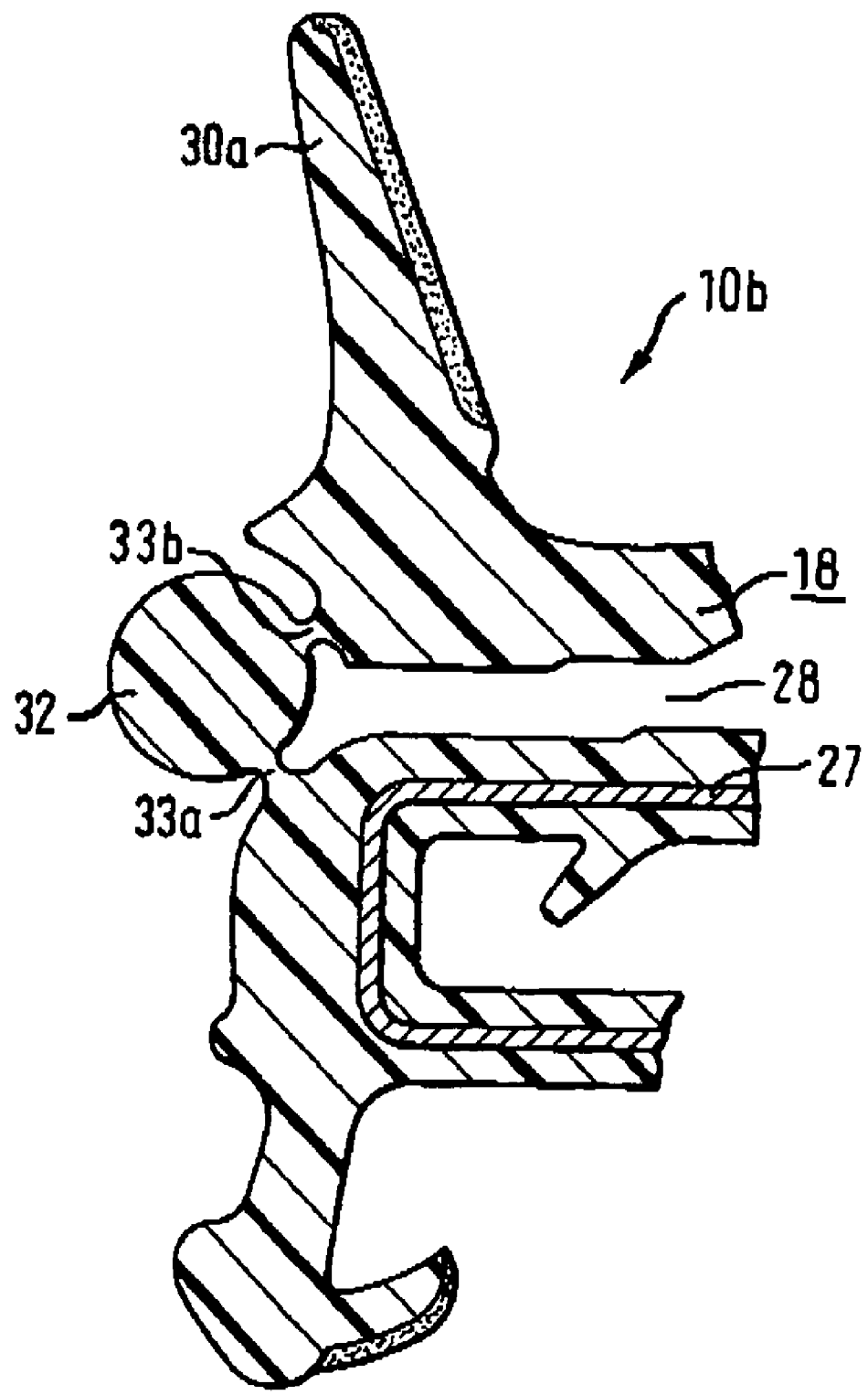

Referring now to FIG. 4 there is illustrated the sealing profile 10b prior to the trim strip 22 being fitted. The retainer channel 28 is closed off endwise by a coextruded peel cord 32 connected to the base body 18 via webs 33a, 33b. The peel cord prevents soiling of the retainer channel 28. Peeling off the peel cord 32 parts the webs 33a, 33b resulting in the retainer channel 28 being rendered open.

Common to all of the embodiments as described above is that the configuration of the trim strip in accordance with the invention ensures facilitated fabrication and fitting.

What is claimed is:

1. A sealing profile for sealing a powered window pane in a motor vehicle door comprising a base body made of an elastomeric material, at which at least one sealing portion and at least one fastening portion for defining said sealing profile at a door flange are provided, and including at least one trim strip comprising a finishing portion and a fastener protruding therefrom for positive definition on said base body, wherein said trim strip is curved lengthwise, said fastener is configured as an elongated insertion limb oriented substantially perpendicular to said finishing portion and at least one appendage is provided, and said base body comprises a flexible reinforcing element which reinforces said finishing portion in the region of said door flange and a slotted, retainer channel extending along a leg of said reinforcing element oriented substantially parallel to said door flange and provided with at least one recess, said fastener being arranged in said retainer channel and said appendage of said fastener positively engaging the corresponding recess of said retainer channel, wherein prior to fitting said trim strip said retainer channel is closed off by a peel cord connected to said base body via webs.

2. The sealing profile as set forth in claim 1, wherein said trim strip is an extruded aluminum part.

3. The sealing profile as set forth in claim 1, wherein said fastener protrudes from an upper end portion of said finishing portion.

4. The sealing profile as set forth in claim 1, wherein said fastener protrudes from a middle portion of said finishing portion.

5. The sealing profile as set forth in claim 1, wherein appendages are configured at said finishing portion, which engage in corresponding recesses of said base body.

6. The sealing profile as set forth in claim 1, wherein said base body comprises a first sealing portion for weathersealing said powered window pane and a second sealing portion for weathersealing said door relative to said vehicle body.

7. The sealing profile as set forth in claim 6, wherein said first sealing portion comprises sealing lips which protrude from said base body and contact said powered window pane.

8. The sealing profile as set forth in claim 6, wherein said second sealing portion comprises sealing lips which protrude from said base body and contact said vehicle body.

9. A sealing profile for sealing a powered window pane in a motor vehicle door comprising:

a base body made of an elastomeric material and comprising:

(a) a first sealing portion for weathersealing the window pane, the first sealing portion having sealing lips which protrude from the base body and are configured to contact the window pane;

(b) a second sealing portion for weathersealing the door relative to the vehicle body, the second sealing portion having sealing lips which protrude from the base body and are configured to contact the vehicle body;

(c) a fastening portion for fastening the sealing profile at a door flange;

(d) a flexible reinforcing element that reinforces the fastening portion in the region of the door flange, the flexible reinforcing element having a leg extending substantially parallel to the door flange; and (e) a slotted retainer channel extending along the leg of the reinforcing element and having at least one recess; and a trim strip extending in a longitudinal direction, the trim strip being curved lengthwise and comprising:
(a) a finishing portion; and
(b) a fastener configured as an elongated insertion limb oriented substantially perpendicular to the finishing portion and having at least one appendage,
wherein the fastener is arranged in the retainer channel and the appendage of the fastener positively engages the corresponding recess of the retainer channel.

10. The sealing profile as set forth in claim 9, wherein the fastener has a side turned away from the leg of the reinforcing element and the base body is free from the reinforcing element in the region that is on the side of the fastener turned away from the leg of the reinforcing element.

11. The sealing profile as set forth in claim 9, wherein the reinforcing element is substantially U-shaped in cross-section.

12. The sealing profile as set forth in claim 10, wherein the reinforcing element is substantially U-shaped in cross-section.

13. The sealing profile as set forth in claim 9, wherein the trim strip is an extruded aluminum part.

14. The sealing profile as set forth in claim 9, wherein the trim strip is substantially L-shaped in cross-section, and wherein the fastener protrudes from an upper end portion of the finishing portion.

15. The sealing profile as set forth in claim 9, wherein the trim strip is substantially T-shaped in cross-section, and wherein the fastener protrudes from a middle portion of the finishing portion.

16. The sealing profile as set forth in claim 9, wherein the finishing portion comprises appendages which engage in corresponding recesses of the base body.

17. The sealing profile as set forth in claim 9, wherein prior to fitting the trim strip, the retainer channel is closed off by a peel cord connected to the base body via webs.

18. The sealing profile as set forth in claim 9, wherein the retainer channel is located between the fastening portion and the first sealing portion.

19. The sealing profile as set forth in claim 9, wherein the retainer channel is located between the fastening portion and the second sealing portion.

* * * * *